(12) United States Patent
Grover et al.

(10) Patent No.: US 7,260,059 B2
(45) Date of Patent: Aug. 21, 2007

(54) EVOLUTION OF A TELECOMMUNICATIONS NETWORK FROM RING TO MESH STRUCTURE

(75) Inventors: Wayne D. Grover, Edmonton (CA); Matthieu Arnold Henri Clouqueur, Edmonton (CA); Kwun Kit Leung, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 1060 days.

(21) Appl. No.: 10/187,314

(22) Filed: Jun. 28, 2002

(65) Prior Publication Data

US 2003/0016623 A1 Jan. 23, 2003

Related U.S. Application Data

(60) Provisional application No. 60/301,120, filed on Jun. 28, 2001.

(51) Int. Cl.
*G01R 31/08* (2006.01)
(52) U.S. Cl. .................... 370/222; 370/242; 398/3
(58) Field of Classification Search ......... 370/254–258
See application file for complete search history.

(56) References Cited

U.S. PATENT DOCUMENTS

| | | | |
|---|---|---|---|
| 5,850,505 A | 12/1998 | Grover et al. ......... 395/182.02 |
| 6,047,331 A | 4/2000 | Medard et al. ............. 709/239 |
| 6,226,111 B1 | 5/2001 | Chang et al. ............... 359/119 |
| 6,331,906 B1 | 12/2001 | Sharma et al. ............. 359/119 |
| 6,333,799 B1 | 12/2001 | Bala et al. ................. 359/128 |
| 6,335,992 B1 | 1/2002 | Bala et al. ..................... 385/17 |
| 6,370,110 B1 | 4/2002 | Eslambolchi ............... 370/216 |
| 6,377,374 B1 | 4/2002 | Davis et al. ................. 359/128 |
| 6,377,543 B1 | 4/2002 | Grover et al. .............. 370/227 |
| 6,404,734 B1 | 6/2002 | Stamatelakis ............... 370/227 |
| 6,421,349 B1 | 7/2002 | Grover ....................... 370/408 |
| 6,606,667 B1 * | 8/2003 | Hermann .................... 709/239 |
| 6,839,514 B1 * | 1/2005 | Sharma et al. ................. 398/2 |

(Continued)

OTHER PUBLICATIONS

Canadian Patent Application No. 2,161,847, filed Oct. 31, 1995 (published May 1, 1997), including drawings and filing certificate, 32 pages.

(Continued)

*Primary Examiner*—Chi Pham
*Assistant Examiner*—Phuc Tran
(74) *Attorney, Agent, or Firm*—Christensen O'Connor Johnson Kindness PLLC

(57) ABSTRACT

Ongoing growth in transport demand is served while deferring or eliminating expenditure for additional capacity by reclaiming the protection capacity and inefficiently used working capacity in existing multi-ring network. Reclamation is through re-design of the routing and restoration in the network using mesh principles within the pre-existing ring capacities. The installed working and protection capacity of existing rings is viewed as a sunk investment, an existing resource, to be "mined" and incorporated into a mesh-operated network that serves both existing and ongoing growth. A complete double or even tripling of demand could be supported with little or no additional capacity investment through the period of ring-to mesh conversion by ring-mining. An existing ring set may be converted to a target architecture of "p-cycles" instead of a span-restorable mesh, through placement of straddling span interface units to convert ring ADMs to p-cycle nodal elements.

10 Claims, 7 Drawing Sheets

U.S. PATENT DOCUMENTS

| | | | |
|---|---|---|---|
| 6,848,006 B1 * | 1/2005 | Hermann | 709/239 |
| 2002/0071392 A1 | 6/2002 | Grover et al. | 370/241 |
| 2002/0187770 A1 | 12/2002 | Grover et al. | 455/403 |

OTHER PUBLICATIONS

Canadian Patent Application No. 2,212,933, filed Aug. 13, 1997 (published Feb. 13, 1999), including drawings and filing certificate, 154 pages.

Canadian Patent Application No. 2,210,207, filed Jul. 11, 1997 (published Jan. 11, 1999), including drawings and filing certificate, 93 pages. (Corresponds to A10 listed above.).

Canadian Patent Application No. 2,269,649, filed Apr. 22, 1999 (published Oct. 22, 2000), including drawings and filing certificate, 21 pages. (Corresponds to C8 listed below.).

Canadian Patent Application No. 2,280,981, filed Aug. 27, 1999 (published Apr. 6, 2000), including drawings and filing certificate, 22 pages. (Corresponds to A11 listed above.).

Canadian Patent Application No. 2,285,101, filed Oct. 6, 1999 (published Apr. 8, 2000), including drawings and filing certificate, 38 pages. (Corresponds to C9 listed below.).

Canadian Patent Application No. 2,307,520, filed Apr. 28, 2000 (published Oct. 29, 2000), including drawings and filing certificate, 131 pages. (Corresponds to C10 listed below.).

U.S. Appl. No. 09/314,518, filed May 19, 1999, including drawings and filing certificate, 21 pages. (Corresponds to C4 listed above.).

U.S. Appl. No. 09/414,474, filed Oct. 7, 1999, including drawings and filing certificate, 38 pages. (Corresponds to C6 listed above.).

U.S. Appl. No. 09/561,355, filed Apr. 28, 2000, including drawings and filing certificate, 125 pages. (Corresponds to C7 listed above.).

Canadian Patent Application No. 2,359,168, filed Oct. 16, 2001, including drawings and filing certificate, 51 pages. (Corresponds to C13 listed below.).

Canadian Patent Application No. 2,360,963, filed Nov. 2, 2001, including drawings and filing certificate, 74 pages. (Corresponds to A12 listed above.).

"Mining the Rings: Strategies for Ring-to Mesh Evolution", Cloqueur, M., Grover, W., Leung, D., Shai, O.; *Reprint from 3rd International Workshop on the Design of Reliable Communication Networks (DRCN 2001)*, Budapest, Hungary, Oct. 2001.

"Protection Cycles in Mesh WDM Networks", Ellinas, G, Hailemariam, A. G., Stern, T. E.; *IEEE Journal on Selected Areas in Communications*, vol. 18, No. 10, Oct. 2000.

"Optimal Capacity Placement for Path Restoration in Mesh Survivable Networks", Iraschko, R., MacGregor, M., Grover, W.; *ICC 1996*, Dallas, Jun. 1996, pp. 1568-1574.

"Mesh/Arc Networking: An Architecture for Efficient Survivable Self-Healing Networks", Brown, G., Grover, W., Slevinsky, J., MacGregor, M.; *1994 IEEE International Conference on Communications*, p. 471-477, May 1-5, 1994.

"Introduction to SONET Networking", NORTEL tutorial handbook, Oct. 30, 1996.

*Fiber Network Service Survivability*, Tsong-Ho Wu, 1992 Archtech House, Inc., Norwood, MA, pp. 1-210 (chapters 1-4).

* cited by examiner

EVOLUTION OF A TELECOMMUNICATIONS NETWORK FROM RING TO MESH STRUCTURE

CROSS-REFERENCE TO RELATED APPLICATION

This application claims the benefit of the filing date of U.S. Provisional Application No. 60/301,120, filed Jun. 28, 2001.

BACKGROUND OF THE INVENTION

Today many network operators have a deployed ring-based network but state that they see "mesh" as the way to go in future with DWDM-based optical networking. It is generally recognized that while rings have been a practical and economic alternative, especially in metro networks, ring networks consume a lot of transmission capacity, making them less suitable for long-haul applications. We have previously analyzed that even efficiently designed ring networks may embody total capacity that is up to three times the shortest-path capacity for the amount of demand they serve.

Ring protection capacity is a source of 100% minimum redundancy, but the efficient utilization of working capacity tends to also be limited by ring loading and "stranded capacity" issues. Additionally demand routing can rarely follow the true shortest path over the facilities graph. At the same time as rings are locking up so much physical transport capacity, some operators can barely deploy new capacity fast enough to keep up with demand. In circumstances of such rapid growth, transport efficiency is important: Even if the cost of the capacity was zero, more efficient transport architectures can serve more revenue-bearing demand for the same installed base of transmission systems.

One method of increasing reliability of a ring such as a SONET ring is proposed in U.S. Pat. No. 6,370,110 issued Apr. 9, 2002. In this patent, a ring is connected, or interworked, with a mesh to access each other's protection capacity. Both ring and mesh continue to exist, and to operate individually as ring and mesh. The only change is that if needed the ring protection channels are made available to the mesh, and vice versa. The method proposed in this patent, however, does not deal with a ring to mesh conversion directed to serving an increased amount of demand.

SUMMARY OF THE INVENTION

Therefore, according to an aspect of the invention, there is provided a method of providing protection for a telecommunications network against failure of a span or node in the telecommunications network, in which the telecommunications network initially has protection organized in rings of connected protection links, the method comprising the steps of breaking a connection between protection links at a node within a ring; and connecting the protection links into a mesh network of protection links, thereby converting the node from a ring node to a mesh node. In a further aspect of the invention, the mesh network is configured into cycles of connected links of spare capacity in readiness for span failure, and a straddling span interface may be added at the node for re-routing failed working channels onto the broken connection links upon failure of the working channels.

Connecting the protection links into a mesh network may be carried out, in one embodiment, by accessing an extra traffic feature of an add-drop multiplexer at a node and connecting the extra traffic feature to a mesh cross-connect at the node.

In order to further increase demand served by the telecommunications network, nodes may be selected for conversion from ring node to mesh node according to an optimization strategy, which may take into account the cost of conversion of the node from a ring node to a mesh node. As part of the ring to mesh conversion process, capacity may be added on a span of the telecommunications network to increase the demand served by the telecommunications network, selected ones of plural add-drop multiplexers from the pre-existing rings may be re-used within the target mesh (or p-cycle) architectures and selected segments of ring capacity in the telecommunications network may be abandoned, salvaged, or left for future use should there be unexpected shifts in the demand patterns.

By this method, ongoing growth in transport demand is served while deferring or eliminating expenditure for additional capacity by reclaiming the protection capacity and inefficiently used working capacity in existing rings. Reclamation is through re-design of the routing and restoration in the network using mesh principles within the pre-existing ring capacities. The installed working and protection capacity of existing rings is viewed as a sunk investment, an existing resource, to be "mined" and incorporated into a mesh-operated network that serves both existing and ongoing growth.

A detailed planning model is given for minimum cost evolution out to a given total growth multiplier that considers factors such as the costs of new mesh capacity additions, nodal costs for mesh access to existing ring capacity and selective ADM conversions and re-use decisions. Increased demand, potentially a doubling or even tripling of demand, may be supported with little or no additional capacity investment through the period of ring-to-mesh conversion by ring-mining. Re-capture of existing installed protection capacity for conversion to service-bearing use would be a one time business strategy opportunity made possible by a ring mining conversion from ring to mesh.

One direction which we propose for evolution of existing ring-based networks is to a target architecture using p-cycles. In this disclosure the span restorable mesh, and the method of p-cycle based networks are examples, albeit the two of our primary practical interest, of alternate architectures for survivable transport networking that are both more capacity-efficient than ring-based networks. We give details of how existing ring based networks could be broken up and re-used for ongoing growth as either a span-restorable mesh, or a network of p-cycles, but it should be understood that in principle once these techniques and concepts are explained, that a corresponding strategy exists to convert an existing ring-set into any other mesh-like or other more efficient target architecture, including, for example, a path-restorable target or a mesh operating on the shared backup path protection scheme.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements. The word link is used to describe a single managed unit of capacity, and may also be referred to as a channel.

Figure 1:
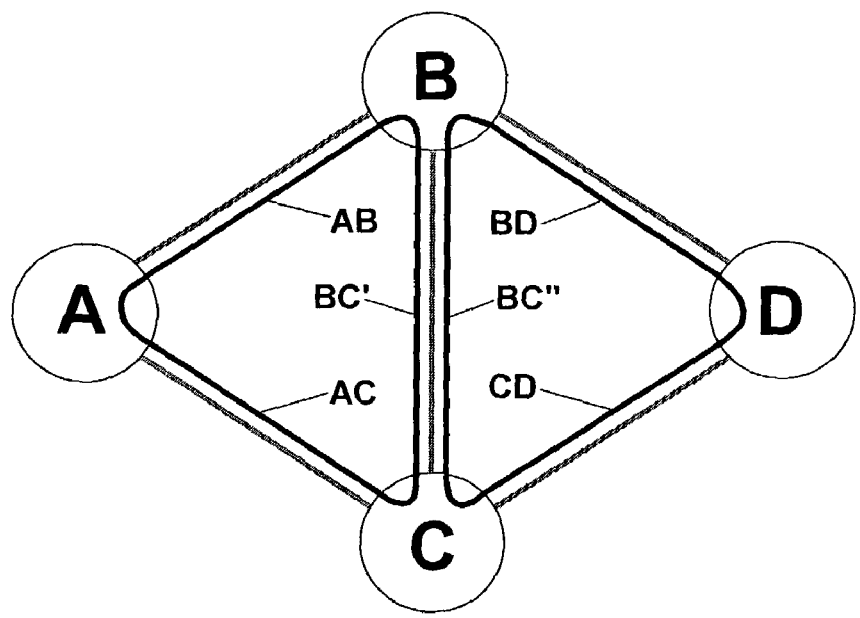
FIG. 1 shows a simplified exemplary network graph with nodes A-B-C protected by a protection ring having protection links AB, AC and BC', and nodes B-C-D protected by a protection ring having protection links BD, CD, BC"

An existing ring-based network may allow for ongoing demand growth by providing access to its raw span capacities and converting the mode of operation to a restorable mesh architecture. This is referred to here as ring mining. FIG. 1 illustrates the principle. In FIG. 1, a network is formed of nodes A ,B, C, D. Nodes A, B and C form a first ring with protection links AB, AC, BC'. Nodes B, C and D form a second ring with protection links BD, CD, BC". Span BC includes protection that is part of both protection rings. Each ring is formed from a connected set of protection links that are connected at each node in the ring. In ring mining, the ring nodes B and C are converted to mesh nodes by allowing, for example, protection channels in the ring A, B and C to communicate with protection channels in ring B, C and D. To accomplish this, the protection links at a node are broken and connected into a mesh of protection links. Real regional networks are more complex and may have up to twenty or so rings, each with up to 16 ADM nodes, and overlapping each other in a partially straddling general way that is fairly complex.

In the initial method of ring mining, there need be no new capacity added at all while nonetheless sustaining ongoing growth solely by conversion to a mesh-restorable mode of operation under the span capacities represented by the rings. This supports revenue growth without adding new transmission equipment for a possibly significant period of time. An operator could serve growth, for possibly a year or more, while capping or deferring major capital additions for transport capacity. Additional growth may be accommodated by relatively small new capacity additions to selected spans on existing rings. In addition, cost savings may be obtained by re-using network elements, and by selective conversion of network elements.

The manner of implementation of ring mining does not depend on the details of ring types involved in the initial network, such as BLSR, UPSR, MS-SPRing, SNCP ring. All rings are structurally 100% redundant in their capacity regardless of their type in that every unit of useful working capacity is matched by an equal unit of protection or redundant working path capacity on the same span of the ring. It is only (i) the transmission line capacity of the ring, (ii) the fraction of the line capacity that is accessible for add/drop at the ADMs (such as in FIG. 2 if less than 100%), and (iii) the "extra traffic" accessibility of the protection channel (or redundant working tributary copies) that fundamentally matters to ring mining. In the case of BLSR or MS-SPRings their line-loop-back restoration mechanism does, however, mean that they are especially amenable to ring-mining because at degree-2 locations they can remain in place functioning as part of a new mesh-restorable network. This is because the loop-back reaction of shared protection ring ADMs retained within chain sub-networks of a mesh is identical to the reaction within the same chain of either a span or path restorable network with respect to intra-chain flows. Additionally we understand that at least in North America, where rings are used in metro high-capacity core or long-haul applications, they are invariably of the BLSR type. Accordingly in a strategy where ADMs can be either converted or re-used, the re-use decision is based on the assumption that they are BLSRs for use of their line loop-back function in the mesh role.

Figure 2:
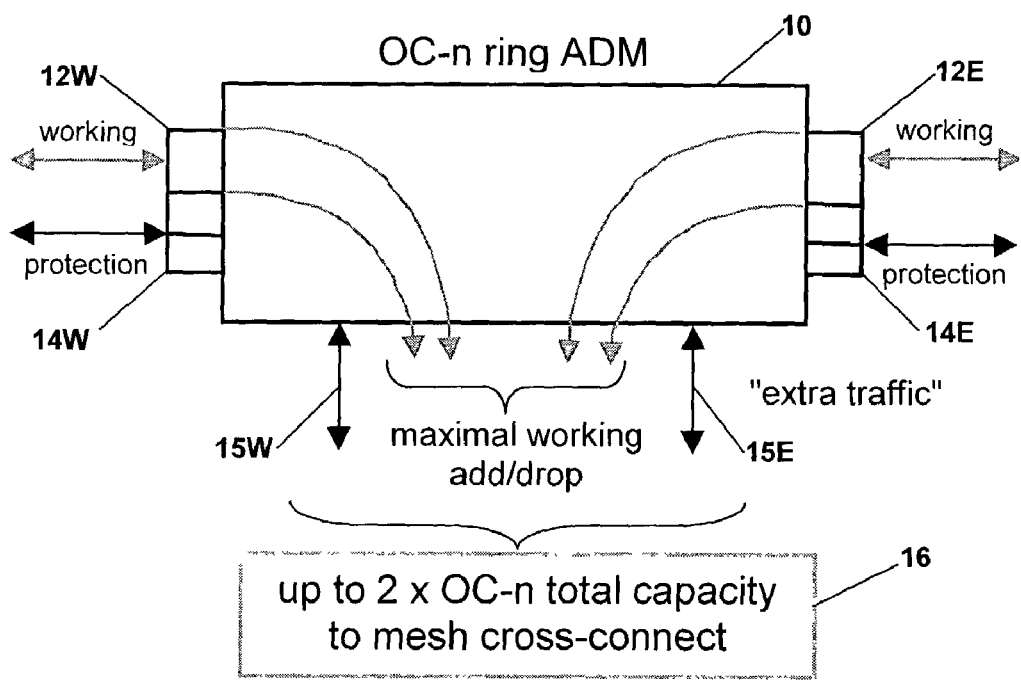
FIG. 2 is a schematic showing one example of how the entire working and protection capacity of a BLSR-type ring ADM may be accessed by a cross-connect node which is the main nodal element of the mesh architecture in a ring mining implementation.

Mesh-oriented access to the capacity of a ring is through ADM nodes of the ring that have been "converted" for ring mining. There may be many different technical means of arranging such access but from a ring mining planning standpoint, the important characteristics are the total amount of ring capacity that can be made accessible to a co-located cross-connect, and the corresponding cost of making this capacity accessible. FIG. 2 is one example of how the entire working and protection capacity of a BLSR-type ring might be accessed. In FIG. 2, an ADM 10 has working channels 12E, 12W and protection channels 14E, 14W. Each protection channel 14E, 14W is accessible through the extra traffic features 15E, 15W of the ADM 10 and the ADM 10 has 100% add/drop access. The ADM 10 can be converted for ring-mining by programming it into the configuration shown in FIG. 2 and "freezing" it that way with the protection channels 14E, 14W connected to a conventional mesh cross-connect 16. If the ADM 10 is suitable for operation in an OC-n line-rate ring ADM, then the total amount of capacity made accessible to the mesh cross-connect may be up to 2×OC-n in each direction on the prior ring-span when both working and protection transmission resources of the rings are considered. This applies to each OC-n ADM at the site. As an example, SONET OC-192 rings may be a prime candidate for ring-mining. An OC-192 is equivalent to an aggregate bit-rate of about 10 Gb/s. So a site such as B in FIG. 1 in a pre-existing ring-based network, that has ADM nodes on, for example, six rings passing through it, would after ring-mining, provide a single mesh node with 3 spans on which a total of up to 12 OC-192 rate line-systems are accessed in a fully non-blocking interconnectable way by the mesh cross-connect. Simple removal of the ADM for salvage is another option for ring to mesh evolution. The remaining fiber optic line systems are then terminated directly on the mesh cross-connects. The option of accessing existing ADM line capacity as in FIG. 2, or simply removing the ADM are both options under this concept. It depends only on the specific economic circumstances.

FIG. 2 is exemplary of how to obtain line-rate or tributary-level access to both spans (E,W) of the ring at converted nodes including its protection (or redundant working) channels. Other models are obviously possible depending on the ADM vendor, features, and so on. The "costs" for conversion may be negative if there is a salvage value for removing the ADM entirely and terminating the fiber line systems directly on optically interfaced cross-connects. Alternatively, the optical line interface functions can be left in place and the ADM function salvaged (i.e., an ADM with separate OLTE). Addition of cross-connects at each node is an expense of ring mining, but is required also by a conventional cap and grow approach. Costs for incremental cross-connect terminations are meant to be part of the cost model for additional mesh capacity. Costs for cross-connect termination of ring-mined capacity are an assumed part of the ADM conversion cost.

Ring mining has been studied for its cost effectiveness and utility on test networks. The results are reported in Clouqueur et al, Mining the Rings: Strategies for Ring-to-Mesh Evolution, 3rd *International Workshop on the Design of Reliable Communication Networks* (*DRCN* 2001), *Budapest, Hungary, October* 2001. In a first strategy, the maximum uniform growth potential may be calculated using a Mixed Integer Programming formulation detailed in this last mentioned paper. This formulation determines the highest uniform multiplier $\lambda$ that can be applied to every element of the demand matrix while keeping the demand both routable and 100% mesh-restorable under span restoration. The formulation is a type of joint working and spare capacity optimization but under span capacity limits set by the "broken up" rings. The formulation is subject to a series of constraints, that (1) scale the demand served to be $\lambda$ times the original demand, (2) ensure that there is enough working capacity in the network to support the routing of all the demands (3) ensure that the sum of restoration flows for each single span cut is equal to the working capacity to be restored, (4) ensure that there is enough spare capacity on each span to support all the restoration flows that cross it in every span failure case, and (5) ensure that the sum of working and spare capacity allocations on each span in the logical mesh does not exceed the amount of capacity on that span as provided by the initial ring set (including capacity previously dedicated as ring protection capacity). The results, reported in the paper, show a uniform growth potential $\lambda$ on the entire demand pattern that ranges from 10% to as much as a tripling in demand served. Over a third of the test cases could sustain a doubling in demand just by ring-to-mesh conversion. Not surprisingly the greater growth multipliers tend to arise in ring networks using the largest ring modular capacities but this is not always the case. One of the OC-48 designs shows only 1.07 sustainable growth factor while two other OC-48 designs are up at $\lambda=2.9$. No simple generalization seems warranted as to which designs will yield the greatest $\lambda$ in this pure ring mining sense. Rather, the potential of the ring mining strategy seems to depend on the details of each network. Hence, some relatively small additions of new capacity on spans of the rings of the network may act like a catalyst to "unlock" significantly more of the ring capacity present. It is important to note that a constant uniform growth factor is computed in this instance simply for purposes of concept illustration. Anyone skilled in the art may readily calculate differential growth factors for each origin-destination (O-D) pair so that total absolute growth is maximized, or to maximize total sustainable growth subject to specific upper limits on the requirements on each O-D pair. In any of the latter cases the bulk amount of sustainable demand growth will be only higher than the case above where the highest common feasible multiplier $\lambda$ on all O-D pairs is found.

In a second, refined strategy, selective additions of new capacity on spans, for example on span BC in FIG. 1 of the network also may significantly increase $\lambda$ during the ring mining process. It is like a gate effect: sometimes very small new capacity additions at key spots on the ring set will "enable" a much larger leap ahead in $\lambda$, by linking ring-set capacities for more efficient continued ring mining. The effect of adding span capacity is reported in the DRCN 2001 paper. The testing uses an IP formulation, with the constraint that the available capacity on each span is now the sum of the capacity reclaimed from the ring design and the added mesh capacity. The formulation minimizes the total capacity investment needed to meet a demand that is $\lambda$ times the original demand served by the ring design. As reported in the DRCN 2001 paper, for a test network initially comprised of seven partially interconnected rings, compared to pure mesh growth for new demands, the overall investment profile to meet the next 220% growth is 50% lower with ring mining and most expenditure is deferred until after the first 40% of added growth.

The ring mining framework may be analyzed with a complete optimization model for transitional growth to get from an existing ring set and demand matrix to a future demand growth multiplier of $\lambda$ at minimum total cost, taking into account that there is a cost for ADM node conversion and a small but non-zero cost (for example for network management software changes) to permit re-use of an ADM as a chain element in the resulting logical mesh design. Such an analysis can also be used to specify at which nodes to break into the rings, where to add new capacity, which ADMs to reuse, and which segments of ring capacity to actually abandon to avoid conversion costs if the overlying mesh can more efficiently carry the relevant demands. The model used for analysis is set forward in the DRCN 2001 paper, and set out below. The constraints (1) ensure that the sum of mesh working and spare capacity on each span does not exceed the amount of available capacity on that span, (2) ensure that the capacity from a ring is not reclaimed on a span that is not covered by that ring and (3) force any ADM to be converted (if at a degree 3+ site) or re-used (if at a degree 2 site) if the capacity of the ring it belongs to is reclaimed on one of its two adjacent spans. This formulation is able to identify the ADMs that are not worth converting or re-using. It has been found that all the conversions are at geographic sites with degree of 3 or more. It is at these sites that accessed ring capacity is being cross-connected for mesh routing and restoration efficiencies. Re-used ADMs are those that play a cost-effective role in a chain of the resulting logical mesh.

The transition from ring to mesh networking can thus represent a financial opportunity for the deferment and reduction of ongoing investment in transport capacity for significant periods of time as represented by sustainable growth factors of 40% to as much as 290%. At the higher end, the sustainable growth potential could represent years of ongoing service growth without the usual transport expenditures. The results presented here were based on quite efficient fully loaded and optimized ring designs. This implies that the ring mining potential in real networks, which may be only partway to their planning horizon or less than optimally loaded, may be greater still. Another factor that could either increase or decrease the ring mining potential in practice would be non-uniform growth in the demand matrix, assuming the equivalent overall growth in total demand as with the multipliers used here.

A BLSR-type ADM ring may also be converted to a mesh having pre-configured cycles of spare capacity in the sense defined by Grover et al, see for example Canadian patent application no. 2,210,207 published Jan. 11, 1999, and U.S. patent application Ser. No. 08/893,491 filed Jul. 11, 1997, now U.S. Pat. no. (not known) by inclusion of suitably configured cross-connects at the nodes. The content of each of these references is hereby incorporated by reference. In a BLSR type ring this may be achieved using the "extra traffic" input feature of BLSR ring systems. "Extra traffic" is normally a feature that allows the network operator to transport any other lower-priority traffic (in compatible format for the rings line-rate signal) over the ring's protection channel. Extra traffic will be bumped off if the ring switches to protect its own working channels.

When ring mining to a target architecture of p-cycles, it may seem natural to think of the p-cycles lying in place with the previous rings of which the p-cycles are now formed. This is certainly possible, but not necessary. In fact it will generally be more advantageous to again abandon the ring-view altogether, simply viewing the logically broken up ring spans as new and available span capacity building blocks within which to plan the best set of p-cycles. As an example with reference to FIG. 1, the most advantageous p-cycle would be formed on the outer perimeter, i.e., on the route A-B-C-D, making a single p-cycle made from parts of the two rings. The two ring spans previously overlapping on span B-C then become completely available as straddling capacity on the new p-cycle and as such (again assuming OC-192 as an example) can support 4 OC-192's worth of protected working capacity with no protection capacity on the straddling span at all. Previously the same spans were overlapped by two rings which would have had the composition of 2×(OC-192 Working, OC-192 protection). Thus the two initial rings had an overall redundancy of 6 Protection/6 working=100% (i.e., two 3-span rings each of 1 working/1 protection fiber per span). Re-constituted to operate as a single p-cycle with span B-C as a straddling span the redundancy improves this to 4 Protection/8 Working OC-192 spans=50% redundancy. This type of conversion operation can be achieved with maximal re-use of the existing ADMs by addition of the straddling span interface (SSIU) at the ring ADMs at locations B and C in FIG. 1.

Figure 3:
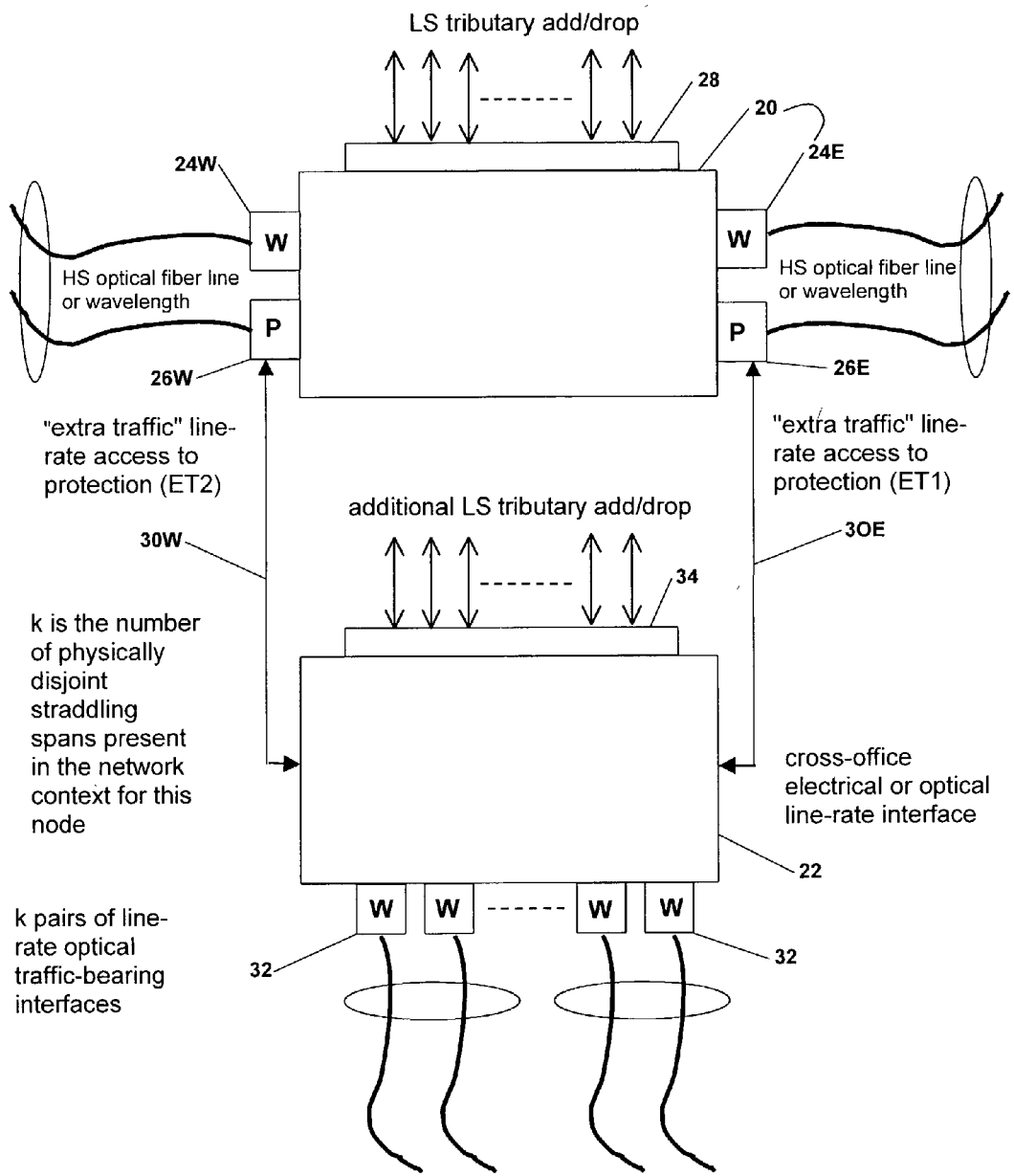
FIG. 3 is a schematic showing equipment at a node of a ring network, in which a straddling span interface is added to access the protection channel of a ring through an ADM or OADM at the node for the case of evolving the ring-set towards more efficient re-use and growth as a reconstituted set of p-cycles.

FIG. 3 shows a generic ADM or OADM 20 as part of a ring configuration, that has been coupled to a straddling span interface (SSIU) 22 that supports p-cycle networking access to the prior conventional ring. ADM 20 has conventional working channels 24E, 24W and conventional spare channels 26E, 26W as well as conventional local tributary add-drop ports 28 and extra traffic ports 30E, 30W. The only point of physical interface between the SSIU 22 and the existing ring is that the SSIU 22 is attached to the extra traffic ports 30E, 30W of the ring. When the SSIU is attached to the ring's extra traffic ports 30E, 30W at the co-located ADM 20, the normal (non-failure) protection channel continuity is then also provided by the SSIU 22, through itself.

Figure 4:
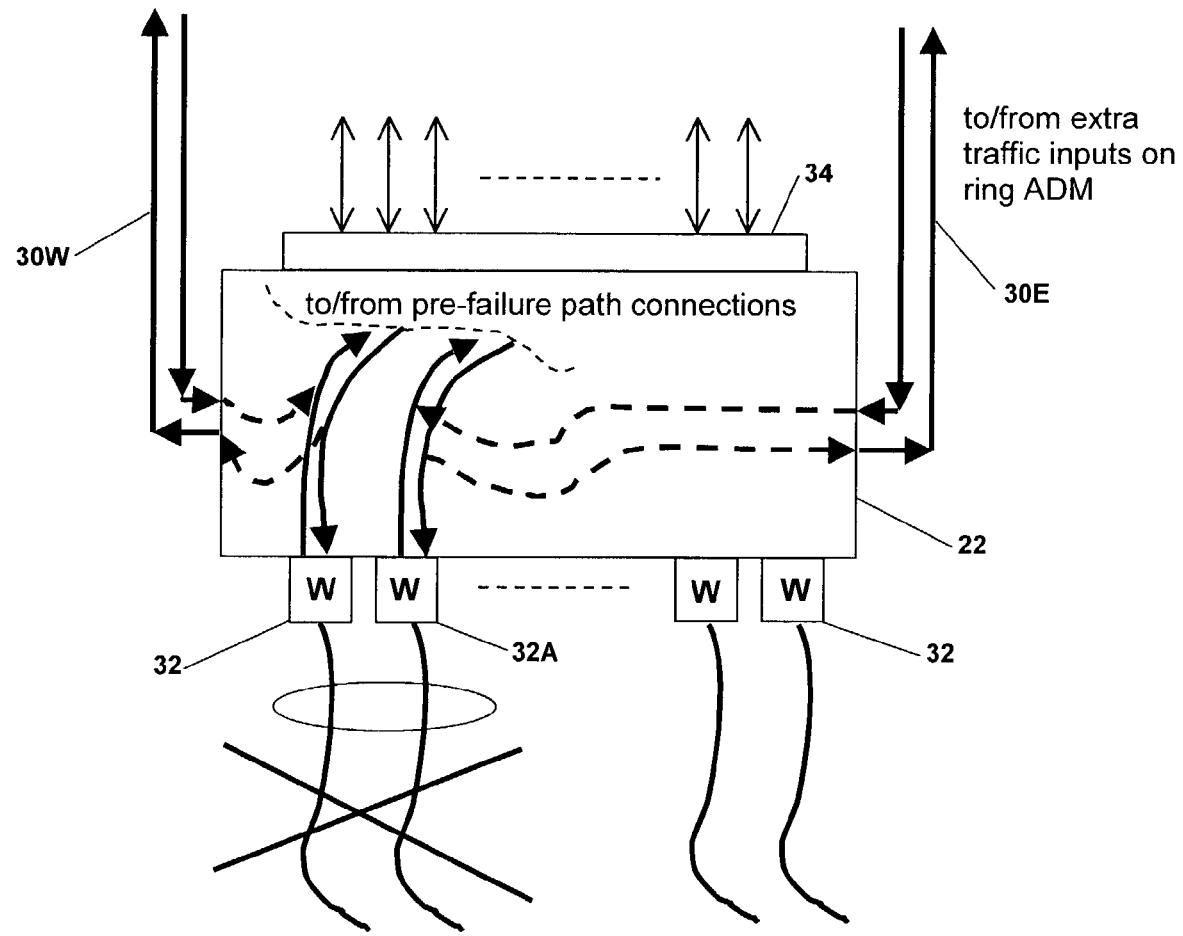
FIG. 4 is a schematic showing how the straddling span interface switches two units of line rate working capacity into the protection channel, using it as p-cycle.

As shown in FIG. 4, the SSIU 22 has plural pairs of working channels 32 that may be connected via internal switching in the SSIU 22 to local tributary add/drop interfaces 34. The SSIU 22 is also connected as in FIG. 3 to the extra traffic ports 30E, 30W.

The ring need not know that the SSIU 22 is anything other than an apparent source/sink of some form of low priority traffic at its site. More pragmatically, however, an exchange of state information is required so the SSIU 22 knows when the protection ring is free in each direction, and for the ADM 20 to be put in protection lockout mode if the SSIU 22 has accessed protection for a straddling failure. In the case of a Sonet ring, or any future ring type where the full protection state and protection protocol is accessible in the line overhead bytes (K1, K2 etc. in Sonet), however, it is believed that co-operation of the SSIU 22 with the ring may be entirely transparent to the existing ADM 20. The SSIU 22 has access to the signalling protocol on the ring protection channel and may be given authority to source/sink protection protocol sequences as needed. Also, because the protection path continuity is through the SSIU 22, not the ADM 20, the SSIU 22 can completely observe the status of the protection channel, observe ring switches, and effectively block out or deny ring switches when needed due to a prior SSIU switch. More specifically, the functions of the p-cycle SSIU 22 are:

1. Normally connect ET1 through to ET2 so that the protection continuity of the ring is normally maintained.

2. Sense either idle pattern or traffic pattern on protection and/or passively monitor the existing ring signalling protocol so it knows the ring protection status. In some conventional networks, the SSIU 22 is connected to the ring-wide internal supervisory LAN, thus enabling almost any further exchange of control and status information and development of any new software upgrades to support SSIU-ring interaction). Alternatively, this status may be directly provided through inter-element communication or by network management.

3. Upon failure in the pre-existing ring (an "on-cycle" failure for the p-cycle) the p-cycle SSIU 22 does nothing except maintain the continuity of the protection channel path through itself. It does, however, note the "in-use" status of the protection channel (as in 2.)

4. As shown in FIG. 4, upon failure of a straddling span for example causing loss of working channel 32A, the SSIU 22 interrupts the through-continuity of the protection path of the prior ring and performs BLSR-like loopback switching to substitute the failed working (bi-directional) signals from the local tributaries 34 into the ring protection channels through the extra traffic ports 30E, 30W. FIG. 4 illustrates switching internal to the SSIU 22 on the assumption where both working line-rate systems 32A on a straddling span are present and both fail. Note that SSIU 22 uses the ring protection in both directions.

Note that, in elaboration on (4.), the SSIU actually has the further information to make intelligent partial use of the ring protection channel in the following more specific cases:

A. A straddling span fails but the ring protection is already in use in both East and West directions from the site of the SSIU. This is a un-protectable dual-failure situation from the point of view of the straddling span. (The other failure is enjoying protection on the ring protection capacity). The SSIU will leave the ring protection in place and raise an alarm. A priority scheme could alternately allow the SSIU to over-ride the existing protected signal.

B. A straddling span fails but the protection channel is in use in one direction (only) from the SSIU site. Visibility to the signalling state on the non-busy direction lets the SSIU know if the protection channel is free all the way to its peer SSIU on the other end of the respective straddling span that has failed. If so, the SSIU can make use of the protection channel to recover one of its possibly two failed working straddling spans.

In the ring mining process, ring spans are preferably broken up and completely taken over as donators of new point to point links for overall operation as a mesh. ADMs are converted to use in a mesh network, or may be wholly removed. Rings are preferably "mined" for use in a mesh that logically completely replaces the rings, to provide an increased amount of demand flow. In the ring mining strategy, the routing of working demands may be changed as part of the conversion strategy.

As indicated above, the ring mining approach may be used to select at which nodes to break into rings, where to add new capacity, which ADMs to re-use and which segments of ring capacity to abandon to avoid conversion costs. Abandoned segments of ring capacity may give rise to salvage benefits, but this is not taken into account in the model described here. One approach is to use a complete optimization model for transitional growth to get from an existing ring set and demand matrix to a future demand growth multiplier of $\lambda$ at minimum total cost. The model takes into account that there is a cost for ADM node conversion and a small but non-zero cost, for example for network management software changes, to permit re-use of an ADM as a chain element in the resulting logical mesh design. A generic conversion cost for ADMs assumes a cost of c, where c=1 is equal to the cost of adding one OC-48 unit of transmission capacity on the average length ring span. A cost may also be assigned for each ADM. Only ADMs located in a geographic site of degree 3 or higher in the basic facilities topology graph are considered for conversion. All other ADMs are considered for simple re-use as degree-2 network elements for the mesh. ADMs have an assumed re-use cost of c/10. If not re-used they can be salvaged. The parameters for the ring design are:

Parameters (inputs):
D Set of O-D pairs with non-zero demand
S Set of spans
$P_i$ Set of eligible restoration routes for span i
$Q^r$ Set of eligible working routes for the $r^{th}$ O-D pair
Uniform demand multiplier (variable)
$d^r$ Initial demand for the $r^{th}$ O-D pair
$\delta_{i,j}^p$ 1 if the $p^{th}$ restoration route for span i uses span j, 0 otherwise
$\zeta_j^{r,q}$ 1 if the $q^{th}$ working route for the $r^{th}$ O-D pair uses span j, 0 otherwise
$g^{r,q}$ Working flow required on the $q^{th}$ working route to satisfy the demand between the $r^{th}$ O-D pair (variable)
$f_i^p$ Restoration flow through the $p^{th}$ route for failure span i (variable)
M Set of different capacity module sizes
$C_j^m$ Cost of a module of the mth size on span j
$n_j^m$ Number of modules of the mth size added on span j (integer variable)
$Z^m$ Number of capacity units for the mth module size
$w_j$ Number of working capacity units logically allocated to span j in the mesh target network.
$s_j$ Number of spare capacity units logically allocated to span j in the mesh.
R Set of rings from the ring design
$x_l^m$ Number of modules of the mth size on ring 1
$E_k$ Conversion/re-use cost for ADM k
A The Set of ADMs from the pre-existing ring design
$\gamma_{j,l}$=1 (one) if span j is covered by ring 1 ("letter ell"), 0 otherwise
$\eta_{k,l}$=1 (one) if ADM k is on ring 1 ("ell"), 0 otherwise
$\beta_{j,k}$=1 if span j is adjacent to ADM k, 0 otherwise
$\mu_{j,l}$=1 if capacity from ring 1 ("ell") is reclaimed on span j, 0 otherwise (variable)
$\rho_k$=1 if ADM k is converted, 0 otherwise (variable)

The objective function to be solved in the IP formulation is:

Minimize $$\left\{ \sum_{j \in S} \sum_{m \in M} n_j^m \cdot C_j^m + \sum_{k \in A} \rho_k \cdot E_k \right\}$$

This objective function may be solved using commercially available IP computer programs, such as CPLEX™ software available from Ilog Inc. of Mountain View, California, USA. Minimization of the objective function is carried out subject to the following constraints:

Constraints:

1. $\sum_{q=1}^{Q^r} g^{r,q} = \lambda \cdot d^r \qquad \forall\, r = 1, 2, \ldots, D.$ 2. $\sum_{r=1}^{D} \sum_{q=1}^{Q^r} \zeta_j^{r,q} \cdot g^{r,q} = w_j \qquad \forall\, j = 1, 2, \ldots, S.$ 3. $\sum_{p=1}^{P_i} f_i^p = w_i \qquad \forall\, i = 1, 2, \ldots, S.$ 4. $\sum_{p=1}^{P_i} \delta_{i,j}^p \cdot f_i^p \leq s_j \qquad \forall\, (i, j) = 1, 2, \ldots, S.\ i \neq j$ 5. $w_j + s_j \leq \sum_{l \in R} \sum_{m \in M} \mu_{j,l} \cdot x_l^m \cdot Z^m + \sum_{m \in M} n_j^m \cdot Z^m \qquad \forall\, j \in S$ 6. $\mu_{j,l} \leq \gamma_{j,l} \qquad \forall\, j \in S\ \ \forall\, l \in R$ 7. $\rho_k \geq \mu_{j,l} \cdot \beta_{j,k} \cdot \eta_{k,l} \qquad \forall\, k \in A\ \ \forall\, j \in S\ \ \forall\, l \in R$ The first term in the objective function represents the cost for adding new capacity modules. The second term represents the cost of converting or re-using ADMs. Constraints 1 scale the demand served to be $\lambda$ times the original demand. In practice, the same growth multiplier will not necessarily arise for every individual demand pair, but the maximal flat demand multiplier gives a relative characterization of the benefits from ring mining. Constraints 2 ensure that there is enough working capacity in the network to support the routing of all the demands. Constraints 3 ensure that the sum of restoration flows for each single span cut is equal to the working capacity to be restored. Constraints 4 ensure that there is enough spare capacity on each span to support all the restoration flows that cross it in every span failure case. Constraints 5 ensure that the sum of mesh working and spare capacity on each span does not exceed the amount of available capacity on that span. The available capacity in this case is the sum of the capacity reclaimed from some rings covering that span plus the sum of newly added modules. Constraints 6 ensure that the capacity from a ring is not reclaimed on a span that is not covered by that ring. Finally, constraints 7 force any ADM to be converted (if at a degree 3+ site) or re-used (if at a degree 2 site) if the capacity of the ring it belongs to is reclaimed on one of its two adjacent spans. Nothing limits the design model to considering only a common growth multiplier. If one has specific differential growth targets to support on each O-D pair in a real network, the constant $\lambda$ simply becomes a vecror of O-D pair-specific $\lambda_r$ growth requirements. They replace $\lambda$ in Constraints (1.) for each respective O-D pair r.

Figure 5:
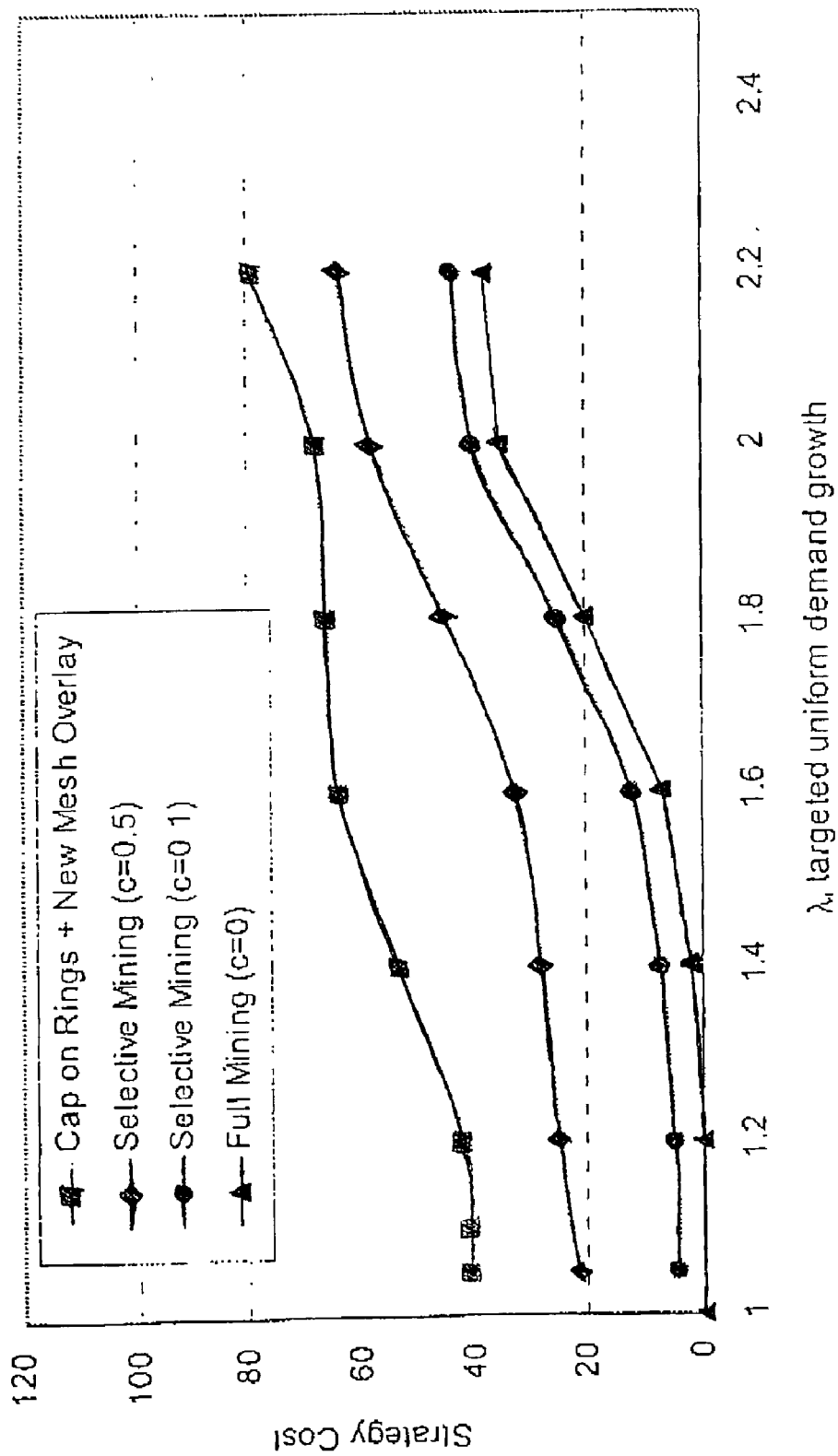
FIG. 5 is a graph showing comparison of reference strategy cost and ring-mining strategy costs with ADM conversion and re-use costs as a parameter.

FIG. 5 shows the time profile of expenditures to meet growth out to $\lambda=2.2$ with ring design 16 which is one of the set of seventeen test cases reported in the DRCN 2001 paper. Even with significant costs for ADM conversion the ring mining strategy is significantly less costly than the reference model of "cap and grow new mesh".

Figure 6:
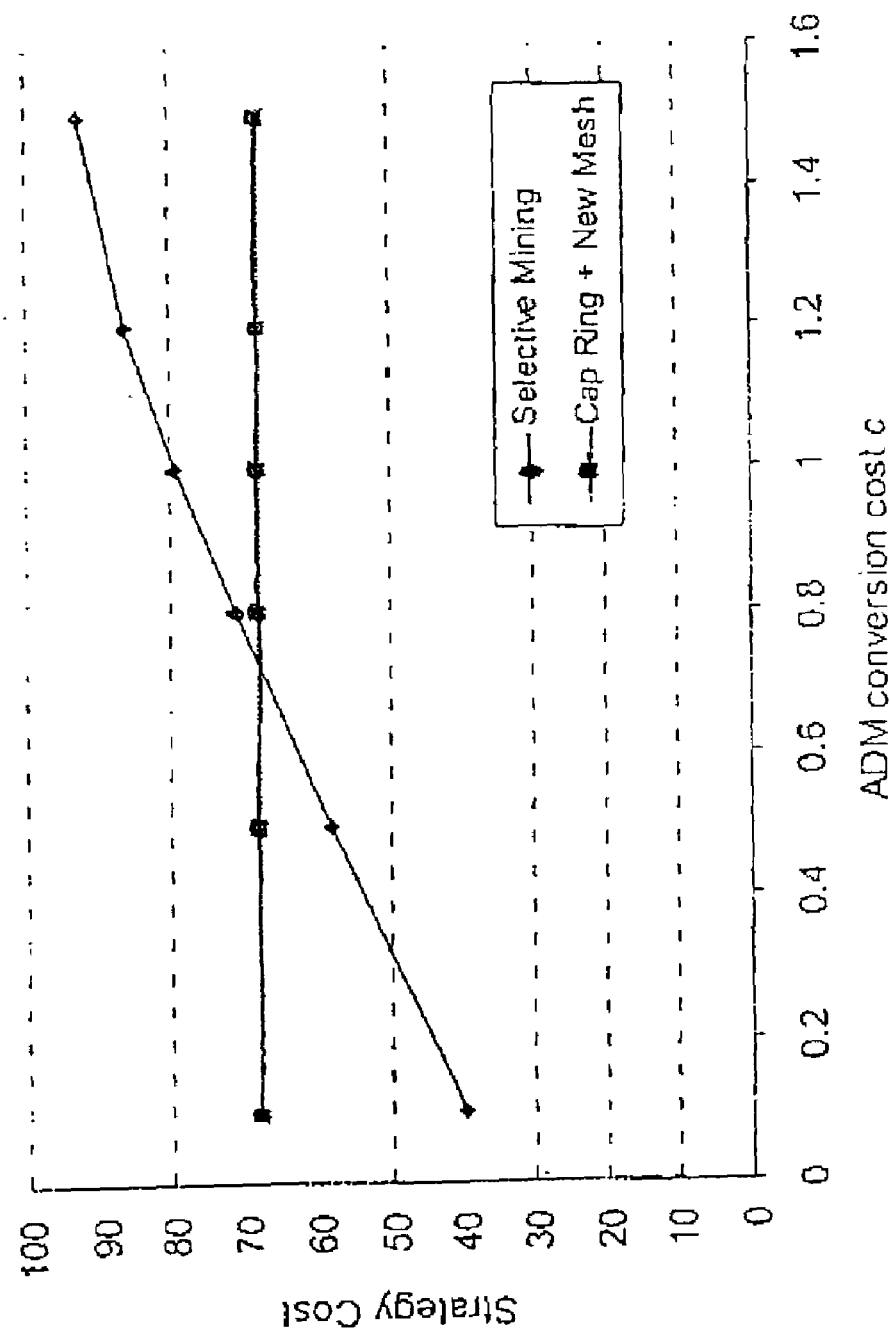
FIG. 6 is a graph showing effect of ADM conversion cost on total transition cost to a demand multiplier of 2.
Figure 7:
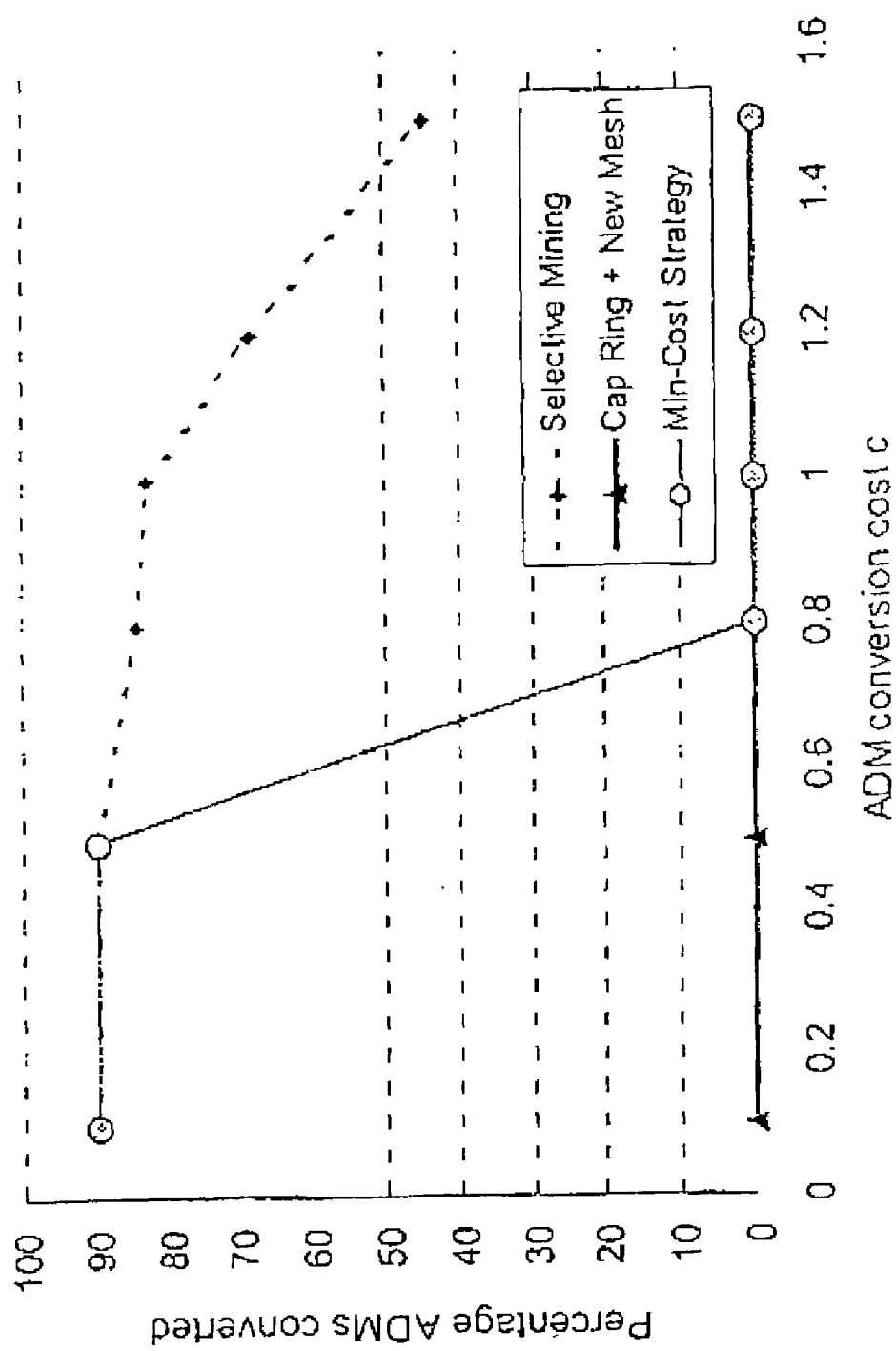
FIG. 7 is a graph showing effect of ADM conversion/re-use cost on the extent of ADM conversions for a demand multiplier of 2.

FIG. 6 and FIG. 7 show the effect of the conversion cost on the total evolution cost to a growth factor $\lambda=2$. In FIG. 6 one can see that above c=0.8 the cost of the ring mining strategy exceeds the baseline cap and grow strategy due to ADM conversion costs. Referring back to FIG. 5, c=0.8 would be the value for which the curve for the selective mining and the one for "Cap on Rings+New Mesh" coincide at $\lambda=2$. Since the curves on FIG. 5 are roughly parallel, the conversion cost for which the min cost strategy changes will not depend greatly on the $\lambda$ considered in the decision. FIG. 7 shows the percentage of eligible ADMs converted for each strategy depending on c. It is interesting to notice that even when c is low, the selective ring mining strategy only selects 90% of the ADMs for conversion. This shows an advantage of the third formulation in that it is able to identify the ADMs that are not worth converting or re-using. FIG. 7 also shows that the pure min cost strategy jumps directly from 90% conversion to 0% conversion at a critical conversion cost between c=0.6 and c=0.8 in this network. At this critical point, even before the selective ring mining strategy starts reducing the number of converted ADMs, the reference strategy is more economical.

Figure 8:
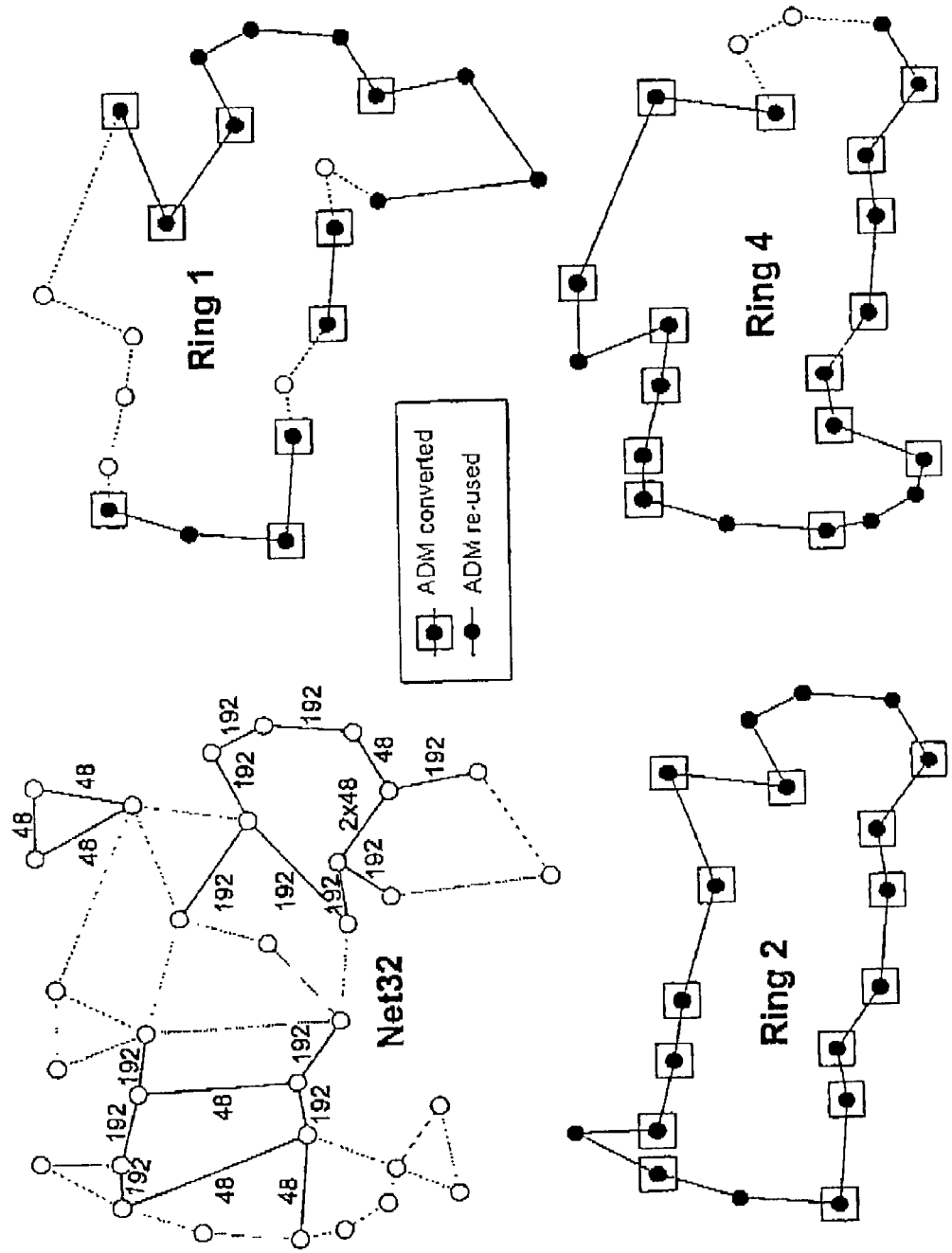
FIG. 8 is a collection of ring-based test networks showing in detail a ring-mining result in which the first four rings of a test Network 16 are ring-mined in detail.

FIG. 8 shows part of the detailed ring mining solution in the 32 node test network of ring design 16 assuming an ADM conversion cost c=0.5 and re-use cost of 0.05 growing out to a uniform doubling of demand. The facilities graph topology is shown in the upper left where added mesh capacity onlays are indicated in bold, annotated with the added module size. Other panels give isolated views of the three largest rings indicating which ADMs were converted for mesh access to their ring capacity and which ADMs are re-used in the ring mining solution. Note that as may be expected, all the conversions are at geographic sites with degree of 3 or more. It is at these sites that accessed ring capacity is being cross-connected for mesh routing and restoration efficiencies. Re-used ADMs are those that play a cost-effective role in a chain of the resulting logical mesh. In this example, 89% of all the eligible ADMs are converted and 92% of ADMs at degree 2 sites are re-used.

A person skilled in the art could make immaterial modifications to the invention described in this patent document without departing from the essence of the invention.

What is claimed is:

1. A method of providing protection for a telecommunications network against failure of a span or node in the telecommunications network, in which the telecommunications network initially has protection organized in rings of connected protection links, the method comprising the steps of:

selecting ring nodes for conversion from ring node to mesh node according to a strategy that increases and optimizes demand served by the telecommunications network, wherein the strategy takes into account the cost of conversion of the selected nodes from ring node to mesh node;

breaking connections between protection links at the selected ring nodes; and connecting the protection links into a mesh network of links of spare capacity, thereby converting each of the selected ring nodes from a ring node to a mesh node.

2. The method of claim 1 in which the mesh network is configured into cycles of connected links of spare capacity in readiness for span failure.

3. The method of claim 2 further comprising the step of adding a straddling span interface at the node for re-routing failed working channels onto the broken connection links upon failure of the working channels.

4. The method of claim 1 in which connecting the protection links into a mesh network comprises accessing an extra traffic feature of an add-drop multiplexer at a node and connecting the extra traffic feature to a mesh cross-connect at the node.

5. The method of claim 1 further comprising the step of adding capacity on a span of the telecommunications network to increase the demand served by the telecommunications network.

6. The method of claim 1 further comprising the step of re-using selected ones of plural add-drop multiplexers within the ring.

7. The method of claim 1 further comprising the step of abandoning selected segments of ring capacity in the telecommunications network.

8. The method of claim 1 in which the strategy uses an integer programming formulation to minimize an objective function that sums the cost for adding new capacity modules and the cost of converting or re-using ADMs.

9. The method of claim 8 in which the objective function is minimized according to a set of constraints selected from the group consisting of:

a) the demand served is a multiple of the original demand;

b) there is enough working capacity in the network to support the routing of all the demands;

c) the sum of restoration flows for each single span cut is equal to the working capacity to be restored;

d) there is enough spare capacity on each span to support all the restoration flows that cross the span in every span failure case;

e) the sum of mesh working and spare capacity on each span does not exceed the amount of available capacity on that span;

f) the capacity from a ring is not reclaimed on a span that is not covered by that ring; and g) any ADM is converted (if at a degree 3+site) or re-used (if at a degree 2 site) if the capacity of the ring it belongs to is reclaimed on one of its two adjacent spans.

10. The method of claim 9 in which the objective function is minimized according to each one of constraints a) through g).

* * * * *

UNITED STATES PATENT AND TRADEMARK OFFICE
CERTIFICATE OF CORRECTION

PATENT NO. : 7,260,059 B2 Page 1 of 1
APPLICATION NO. : 10/187314
DATED : August 21, 2007
INVENTOR(S) : W.D. Grover It is certified that error appears in the above-identified patent and that said Letters Patent is hereby corrected as shown below:

On the title page item 57, line 11, "double" should read --doubling--

On the title page item 57, line 13, "ring-to mesh" should read --ring-to-mesh--

Signed and Sealed this

Twenty-sixth Day of August, 2008

JON W. DUDAS
*Director of the United States Patent and Trademark Office*